United States Patent [19]
Massicotte

[11] Patent Number: 6,035,890
[45] Date of Patent: Mar. 14, 2000

[54] RETAINER INSERT FOR A VALVE HAVING A FLOATING CLOSURE MEMBER

[75] Inventor: Michel Massicotte, Boucherville, Canada

[73] Assignee: Pratt & Whitney Canada Inc., Longueuil, Canada

[21] Appl. No.: 09/088,893

[22] Filed: Jun. 2, 1998

[51] Int. Cl.⁷ .................................................. F16K 15/00
[52] U.S. Cl. .................................. 137/533.11; 137/533.13
[58] Field of Search ........................... 137/533.11, 533.13, 137/533.15, 539, 593.5; 251/64

[56] References Cited

U.S. PATENT DOCUMENTS

| | | | |
|---|---|---|---|
| 3,105,516 | 10/1963 | Werra et al. ........................ | 137/533.11 |
| 3,723,996 | 4/1973 | Raible et al. ........................ | 137/533.11 |
| 4,069,840 | 1/1978 | Brown et al. ........................ | 137/533.11 |
| 4,217,846 | 8/1980 | Wight ................................. | 137/533.11 |
| 4,282,897 | 8/1981 | De Mey, II ......................... | 137/533.11 |
| 4,634,048 | 1/1987 | Hasse ................................. | 137/533.11 |

*Primary Examiner*—Denise L. Ferensic
*Assistant Examiner*—Joanne Y. Kim
*Attorney, Agent, or Firm*—Jeffrey W. Astle

[57] ABSTRACT

A valve comprising a valve body defining a flow path, a seat upon which a closure member may rest for blocking an outlet port of the valve body, and a spacer removably mounted in the valve body to provide at least one arresting surface against which the closure member may abut when displaced in an open position by fluid pressure. The spacer prevent the closure member from frictionally contacting the inner surfaces of the valve body.

10 Claims, 3 Drawing Sheets

RETAINER INSERT FOR A VALVE HAVING A FLOATING CLOSURE MEMBER

BACKGROUND OF THE INVENTION

1. Field of the Invention

The present invention relates to pressure-valves and, more particularly, pertains to a retainer insert adapted to be installed inside of a valve body for reducing the friction of a floating closure member against inner surfaces of a valve body.

2. Description of the Prior Art

FIG. 1 illustrates a known type of valve comprising a ball 12 which is displaceable along a vertical axis by fluid pressure to allow a fluid to flow from an inlet port 14 to an outlet passage 16 defined in a valve body 18. The valve body 18 defines an annular seat 20 on which the ball 12 sealingly rests when the pressure exerted on an upstream facing surface thereof is less than the weight of the ball 12 or than the sum of the downward forces exerted thereon. Under such conditions, the outlet passage 16 of the valve 10 is closed by the ball 12. As depicted by reference numeral 12', when the fluid pressure on the upstream side of the ball 12 becomes greater than the downward forces exerted thereon, the latter is displaced upwardly against a plurality of inwardly bent tabs 22. The tabs 22 are uniformly distributed about the circumference of the upper end portion of the valve body 18 to allow fluid to flow through the outlet passage 16. The tabs 22 form and integral part of the valve body 18 and are flexible in order to permit the replacement of the ball 12.

Although the above valve 10 is effective for controlling a fluid flow passing therethrough, it has been found that the movements, such as chattering of the ball 12 against the tabs 22 causes the erosion of the latter and consequently premature wear of the valve body 18.

SUMMARY OF THE INVENTION

It is therefore an aim of the present invention to provide a retainer insert which is adapted to minimize wear of a valve.

It is also an aim of the present invention to provide a retainer insert which is easily replaceable.

Therefore, in accordance with the present invention, there is provided a valve defining a flow path and a valve cavity comprising a seat upon which a floating closure member rests when fluid pressure on an upstream side of the closure member is less than an opening valve pressure of the valve thereby blocking an outlet port of the valve body. The valve further includes retaining means removably mounted in the valve cavity to provide at least one arresting surface against which the closure member may abut when displaced in an open position by fluid pressure.

In accordance with a general aspect of the present invention, the retaining means include a retainer insert which is disposed at an entry area of the valve cavity through which the closure member may be selectively inserted or removed. Typically, the entry area includes a tapered portion configured to restrict movements of the retainer insert towards the seat of the valve.

In accordance with a general aspect of the present invention, the retaining means further include at least one retaining ring disposed in a groove defined in the entry area of the valve cavity for preventing the retainer insert from being expelled outside of the entry area.

In accordance with a general aspect of the present invention, there is provided a valve comprising a valve body defining a flow path and a valve cavity including a seat upon which a closure member may rest for blocking an outlet port of the valve. The valve further includes a spacer insert adapted to prevent the closure member from frictionally contacting the valve body when the closure member is displaced in an open position thereof. Retaining means are provided for preventing the closure member from exiting the valve body.

BRIEF DESCRIPTION OF THE DRAWINGS

Having thus generally described the nature of the present invention, reference will now be made to the accompanying drawings, showing by way of illustration a preferred embodiment thereof, and in which.

DESCRIPTION OF THE PREFERRED EMBODIMENTS

Figure 1:
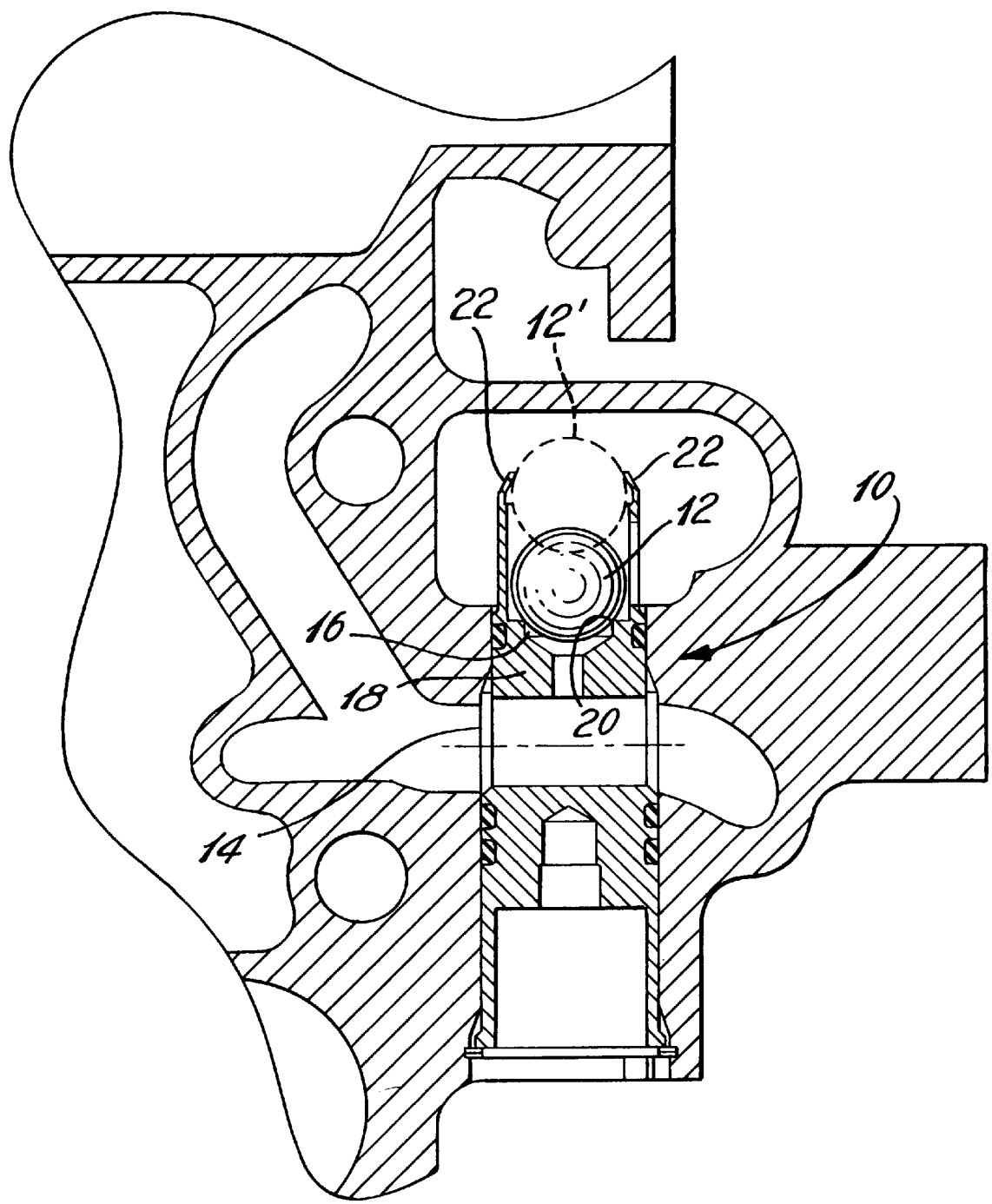
FIG. 1 is a vertical cross-sectional view of a prior art three-way valve.
Figure 2:
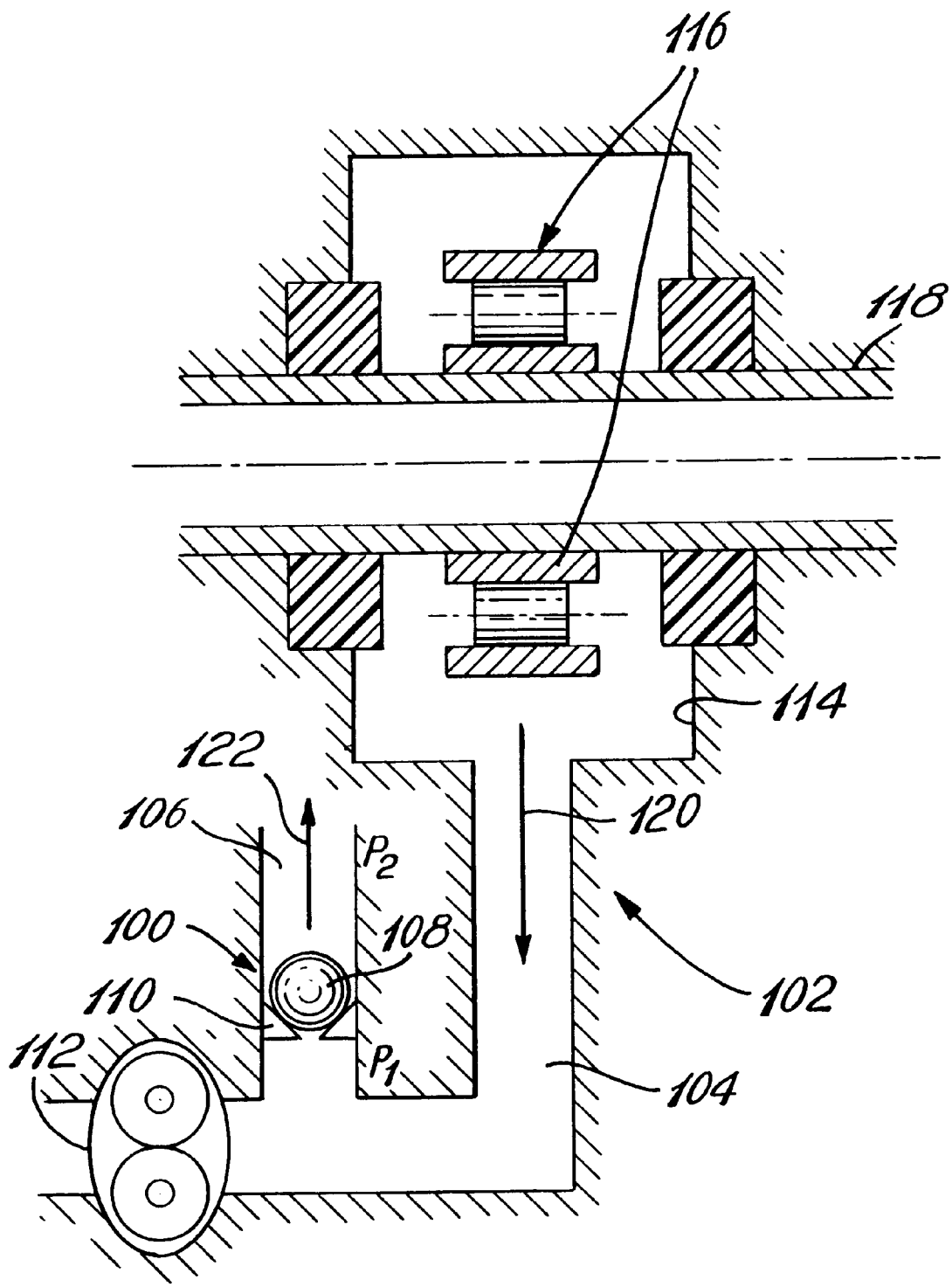
FIG. 2 is a schematic illustration of a portion of a lubricating system of a gas turbine engine showing a valve installed in a fluid line connected in parallel to a main fluid line of the lubricating system according to the present invention.
Figures 3, 4:
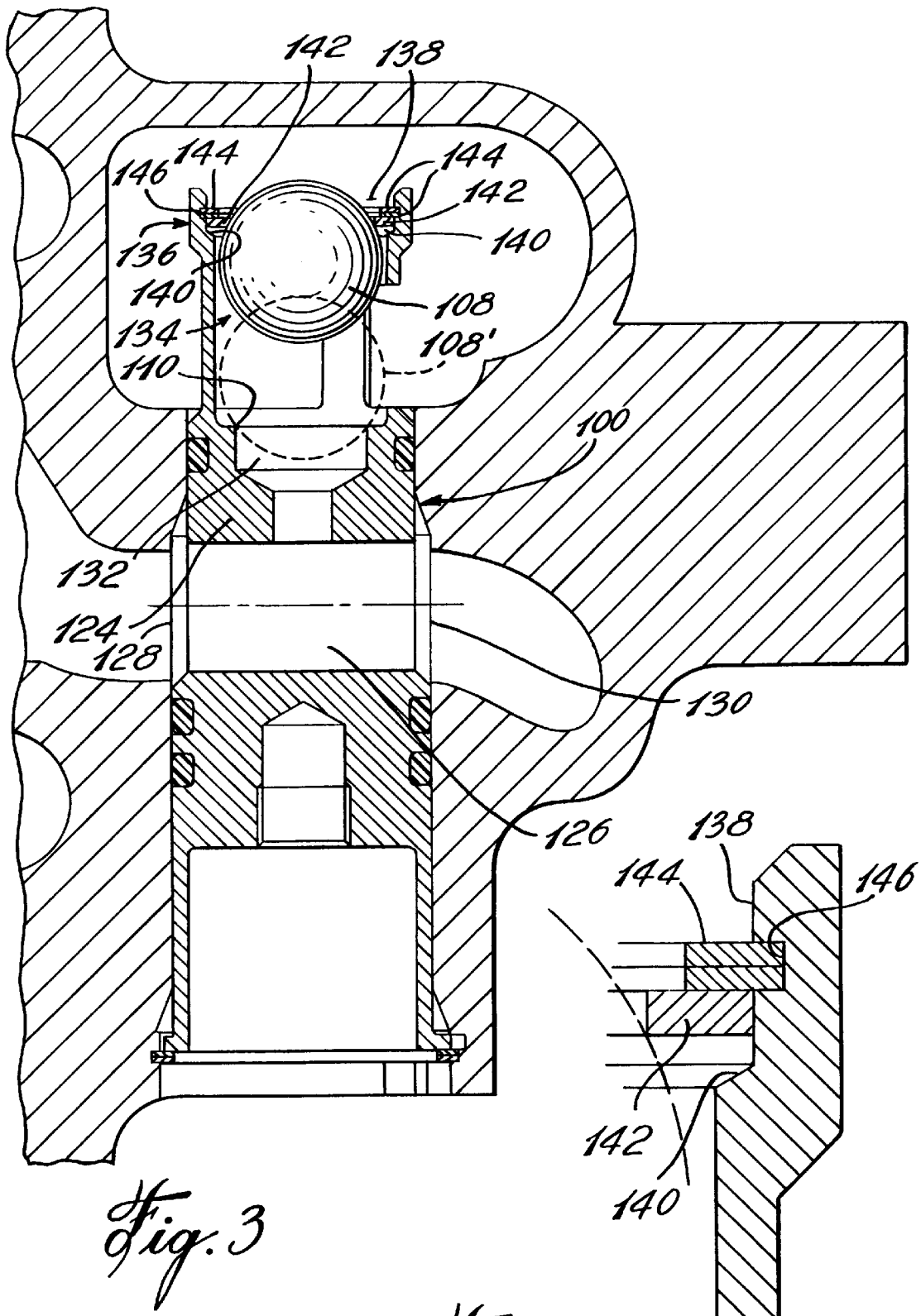
FIG. 3 is a vertical cross-sectional view of the valve of FIG. 2 showing a retainer ring disposed at one end of the valve for limiting the movement of a closure member.
FIG. 4 is an enlarged view of an entry area defined in the body of the valve of FIG. 3.

Referring to the drawings, and in particular to FIGS. 2 and 3, a three-way valve in accordance with the present invention and generally designated by numeral 100 will be described.

As shown in FIG. 2, the valve 100 may be installed in a lubricating system 102 of a gas turbine engine of an aircraft for diverting, under certain operating conditions, a portion of the flow of a lubricating fluid passing through a main fluid line 104 into a secondary fluid line 106 mounted in parallel thereto. The valve 100 generally comprises a closure member, such as a ball 108, which can be displaced upwardly away from a valve seat 110 for allowing the lubricating fluid to flow through the secondary fluid line 106 when sufficient fluid pressure is exerted on a downstream facing surface of the ball 108.

The lubricating system 102 comprises a pump 112 connected to the main fluid line 104 for drawing the lubricating fluid out of a bearing housing 114 containing bearings 116 which are disposed and configured to support a main rotating shaft 118 of the gas turbine engine.

More specifically, under starting condition, the pressure generated by the compressor (not shown) of the gas turbine engine is not sufficient to prevent the lubricating fluid supplied to the bearing housing 114 from flowing through the cabin ventilation system (not shown). The pump 112 must therefore be operated such as to create a vacuum in the bearing housing 114 thereby forcing the lubricating fluid to flow through the main fluid line 104 towards the pump 112, as indicated by arrow 120. At this particular stage, it is understood that the fluid pressure $P_1$ upstream of the valve 100 is less than the valve opening pressure, i.e. the sum of the weight of the ball 108 and the pressure $P_2$ on the downstream side thereof, and thus the ball 108 sealingly rests on the valve seat 110 to block fluid flow through the secondary fluid line 106.

When normal operating conditions are reached, the fluid pressure $P_1$, upstream of the valve 100 becomes greater than the valve opening pressure and consequently the ball 108 is displaced away from the valve seat 110 to thus enable lubricating fluid to flow through the secondary fluid line 106, as indicated by arrow 122, and then through an accessory gear box (not shown) communicating therewith. Accordingly, the pump 112 will continue to draw the same quantity of fluid and the excess flow generated by the action of the compressor will pass through the secondary fluid line 106. Typically, under normal operating conditions the pressure $P_1$ and $P_2$ are in the order of 100 psi and 40 psi, respectively. It is the compressor which causes the pressure $P_1$, to be greater than the pressure $P_2$.

Thereafter, both the lubricating fluid drawn by the pump 112 and the lubricating fluid flowing through the secondary fluid line 106 are submitted to appropriate treatments and subsequently returned to a supply tank (not shown). For instance, according to the above described application, the lubricating fluid consists of a mixture of air and oil and thus the air must be removed from the oil prior to returning the oil to the supply tank.

Referring now to FIG. 3, it can be seen that the three-way valve 100 comprises a valve body 124 defining a primary flow path or fluid passage 126 for conducting a fluid from an inlet port 128 to a first outlet port 130 and a secondary fluid passage 132 communicating with the primary fluid passage 126 for directing a fluid from the inlet port 128 to a second outlet port (not shown). The primary and secondary fluid passages 126 and 132 each have a substantially cylindrical configuration.

The valve seat 110 is integrally formed in the secondary fluid passage 132 of the valve body 124 and has an annular configuration to match the contour of the ball 108, thus fluid cannot pass between the ball 108 and the valve seat 110 when the ball 108 is in a closed position in order to block fluid flow through the secondary fluid passage 132 of the valve 100, as shown in dotted lines with reference to numeral 108'.

The ball 108 is trapped inside a cavity 134 defined in the valve body 124 and will float therein. The cavity 134 includes an entry area 136 which comprises a cylindrical portion 138 and a tapered portion 140 extending downwardly from the circumference of the cylindrical portion 138. The cavity 134 is dimensioned and configured such as to permit insertion and removal of the ball 108 from the valve 100.

Once the ball 108 has been introduced into the cavity 134, an annular insert 142 is disposed therein for providing a seat against which the ball 108 may abut when displaced in an open position thereof by fluid pressure. A conventional retaining ring 144 is installed in an annular groove 146 defined in the cylindrical portion 138 of the entry area 136 of the cavity 134 to block the annular insert 142. The downward movements of the annular insert 142 are limited by the inner conical wall defining the tapered portion 140 of the entry area 136 of the cavity 134.

The annular insert 142 may be made of any suitable material that is softer than the material from which the ball 108 is made but hard enough not to wear too rapidly. For instance, if both the ball 108 and the annular insert 142 are made of steel, the insert 142 would be constituted of a more malleable steel than that of the ball 108.

According to a preferred embodiment of the present invention, the ball 108 has a diameter of 11/16 inch and the annular insert 142 has an inner diameter of 0.6 inch, and outer diameter of ¾ inch and a thickness of about 0,04 inch.

In operation, the ball 108 sealingly rests upon the valve seat 110 as long as the fluid pressure on the upstream side of the valve 100 is inferior to the opening pressure of the valve 100. Accordingly, under such conditions, the fluid only flows through the primary fluid passage 126 of the valve 100.

When the value of the fluid pressure upstream of the valve 100 becomes greater than the valve opening pressure, the ball 108 is displaced upwardly against the annular insert 142 thereby allowing the fluid to flow through the secondary fluid passage 132 and the outlet opening 133 defined in the valve body 124. The annular insert 142 retains the ball 108 inside of the cavity 134 and acts as a spacer for preventing the ball 108 from directly contacting the valve body 124 when urged in the open position thereof by the fluid pressure. The annular insert 142 contributes to increase the life service of the valve 100, as it prevents the ball 108 from wearing by friction the inner walls of the valve body 124.

When the annular insert 142 is damaged due to use over a certain period of time, it can be readily replaced by a new similar annular insert.

Therefore, the above described arrangement is highly advantageous as it minimizes the wear of the valve body 124 and thus reduces the cost associated with the utilization of the above described type of valve.

It is understood that the valve 100 is not restricted to the above described gas turbine engine application and that it may be employed in any other applications which necessitate the control of a fluid flow through a conduit.

It is claimed:

1. A valve for use with an engine comprising a valve body defining a flow path and a valve cavity comprising a seat upon which a floating closure member rests when fluid pressure on an upstream side of said closure member is less than an opening valve pressure of said valve thereby blocking an outlet port of said valve body, and retaining means removably mounted at one end of said valve cavity so as to provide ready access thereto, said retaining means defining at least one arresting surface against which said closure member will abut when displaced in an open position by fluid pressure, said arresting surface being configured to generally conform to a periphery of said closure member, thereby substantially preventing the same from frictionally contacting a peripheral wall of said valve cavity when urged to said open position thereof by fluid pressure.

2. A valve as defined in claim 1, wherein said arresting surface of said retaining means is constituted of a material which is softer than the material from which is formed said closure member.

3. A valve as defined in claim 2, wherein both said arresting surface and said closure member are made of steel, said arresting surface being made from a steel which is more malleable.

4. A valve as defined in claim 1, wherein said retaining means includes a retainer insert, and wherein said valve cavity includes an entry area through which said closure member may be selectively inserted or removed, said entry area including a tapered opening portion configured to restrict movements of said retainer insert towards said seat.

5. A valve as defined in claim 4, wherein said retaining means further include a retaining ring disposed in a groove defined in said entry area of said valve cavity for preventing said retaining insert from being expelled outside of said entry area.

6. A valve as defined in claim 4, wherein said closure member is a ball having a contour, and wherein said retainer insert has an annular configuration adapted to match said contour of said ball.

7. A valve for use with an engine comprising a valve body defining a flow path and a valve cavity including a seat upon which a closure member may rest for blocking an outlet port of said valve, a spacer insert positionable into an entry end of said valve cavity downstream from said seat for preventing said closure member from frictionally contacting said valve body when said closure member is displaced to an open position thereof, and retaining means for preventing withdrawal of said spacer insert from said valve cavity through said entry end.

8. A valve as defined in claim 7 wherein said entry end has a tapered opening portion configured to restrict movements of said spacer insert towards said seat, and wherein said closure member is configured and sized to be selectively inserted and removed from said valve cavity through said entry end.

9. A valve as defined in claim 8, wherein said retaining means include a retaining ring disposed in an annual groove defined in said entry end of said valve cavity for preventing said spacer insert from being expelled outside of said entry end.

10. A valve as defined in claim 9, wherein said closure member is a ball having a contour, and wherein said spacer insert has an annular configuration adapted to match said contour of said ball.

* * * * *